United States Patent
Reiner et al.

[19]

[11] Patent Number: 5,999,713
[45] Date of Patent: *Dec. 7, 1999

[54] CHIP CARD WITH A CONTACTLESS ENERGY SUPPLY AND DATA TRANSMISSION DEVICES

[75] Inventors: Robert Reiner, Unterhaching; Gerhard Schraud, Mering; Walter Strubel, Seefeld; Heiko Fibranz, München; Joachim Weitzel, Markt Indersdorf, all of Germany; Dominik Berger, Graz, Austria; Wolfgang Eber, Graz, Austria; Gerald Holweg, Graz, Austria

[73] Assignees: Siemens Aktiengesellschaft, Munich, Germany; U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,903

[22] Filed: Aug. 26, 1996

[30] Foreign Application Priority Data

Aug. 25, 1995 [DE] Germany .......................... 195 31 372

[51] Int. Cl.⁶ .................................................. G06F 13/00
[52] U.S. Cl. ...................... 395/282; 235/492; 395/750.01
[58] Field of Search ........................... 235/492; 365/226; 395/282, 283, 281, 284, 750.01

[56] References Cited

U.S. PATENT DOCUMENTS

| 5,206,495 | 4/1993 | Kreft ........................................ 235/492 |
| 5,594,233 | 1/1997 | Kenneth et al. ......................... 235/492 |

FOREIGN PATENT DOCUMENTS 0 424 726 A1  5/1991  European Pat. Off. .

*Primary Examiner*—Glenn A. Auve
*Attorney, Agent, or Firm*—Herbert L. Lerner; Laurence A. Greenberg

[57] ABSTRACT

A chip card includes a semiconductor chip that contains at least one memory. In order to supply energy to the chip and to provide for bi-directional data transmission from and to the chip, both contacts and a device for contactless data transmission are provided. A triggerable switch device which is provided on the chip connects the memory either to the contacts or to the device for contactless data transmission as a function of a state of an output signal of a logic circuit connected to at least a voltage supply contact. The switch device assumes a position of repose when it is not triggered and in that position it connects the memory to the device for contactless data transmission, while only upon application of a voltage to the supply voltage contact, triggered by the logic circuit, does it connect the contacts to the memory.

5 Claims, 1 Drawing Sheet

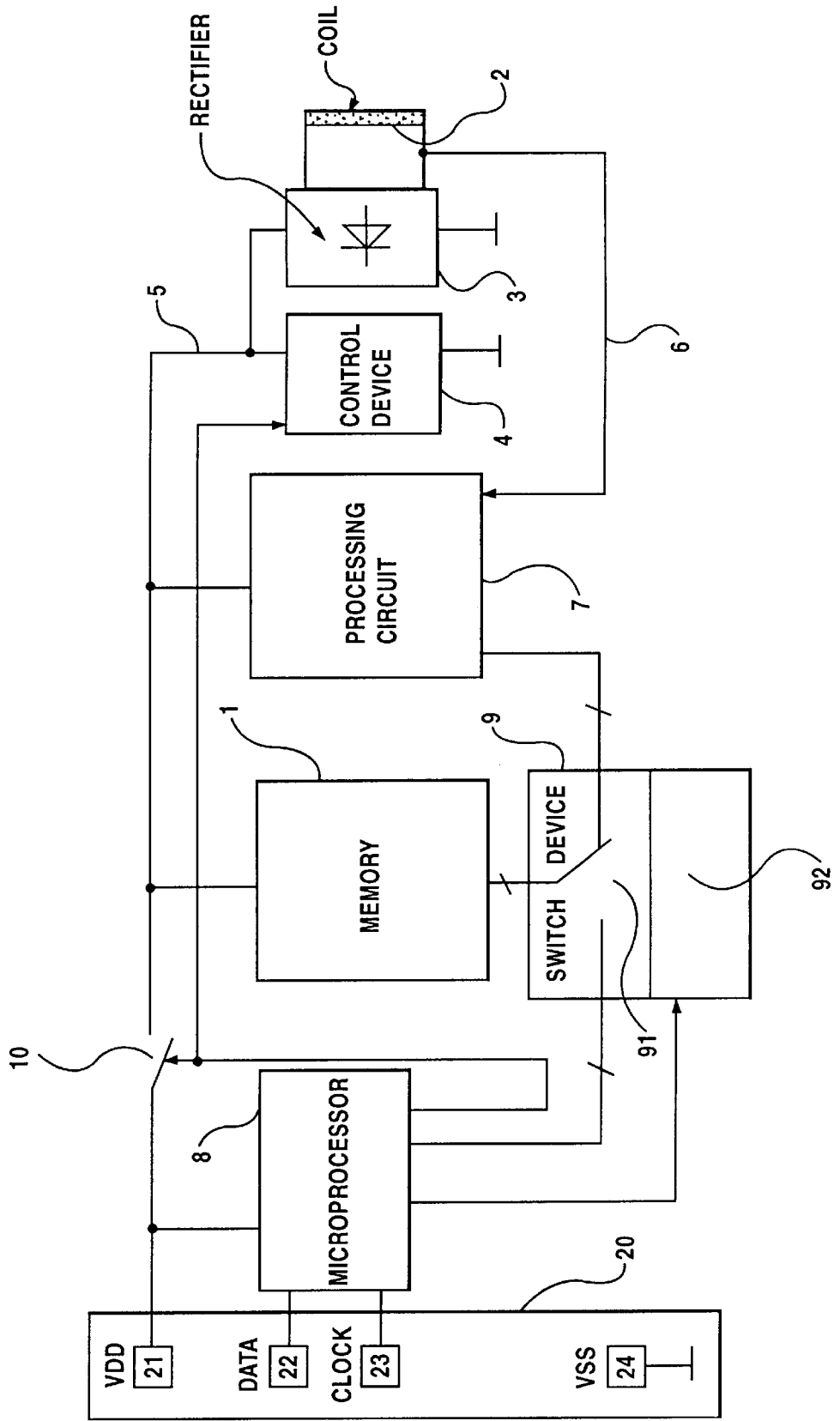

CHIP CARD WITH A CONTACTLESS ENERGY SUPPLY AND DATA TRANSMISSION DEVICES

BACKGROUND OF THE INVENTION

Field of the Invention

The invention relates to a chip card having a semiconductor chip that contains at least one memory, contacts and a device for contactless data transmission for supplying energy to the chip and for bi-directional data transmission from and to the chip, and a triggerable switch device disposed on the chip for connecting the memory either to the contacts or to the device for contactless data transmission, depending on a state of an output signal of a logic circuit connected to at least a voltage supply contact.

One such chip card is already known from Published European Patent Application 0 424 726 A1. In that device, the logic circuit is constructed as a comparator having one input which is connected to the supply voltage contact. The other input of the comparator is connected, through a rectifier and smoothing network, to coils for contactless energy and data transmission. An output of the comparator operates as a function of voltages applied to its two inputs to trigger a multiplexer which operates as a function of the status of the output signal of the comparator to switch either the supply voltage and the signals of the contacts, or the supply voltage and the signals that have been derived from the signal received by the coils, to a microprocessor that is also connected to the multiplexer and has an associated memory.

Accordingly, in the known chip card, an automatic switchover to either the contacts or the coils is possible, depending on where the chip card has received its supply voltage from. However, one disadvantage of that device is that the memory is always connected to an input/output interface which furnishes the higher supply voltage. As a result, even if the chip card was inserted into a conventional card reader that has contacts, the multiplexer could be switched over by the application of a strong electromagnetic field, thus making misuse of the card possible. That is a problem, above all because in such combined cards, in which energy and data transmission can be carried out either through contacts or contactlessly through coils, and where those cards are used as debit cards, debiting of the card is normally carried out through the contactless transmission route, while incrementing the value of the card is carried out through the conventional transmission route, with contacts. That provides an inducement to swindlers to manipulate the card while it is inserted in a conventional card reader for charging.

SUMMARY OF THE INVENTION

It is accordingly an object of the invention to provide a chip card, which overcomes the hereinafore-mentioned disadvantages of the heretofore-known devices of this general type in such a way that such misuse is not possible.

With the foregoing and other objects in view there is provided, in accordance with the invention, a chip card, comprising a semiconductor chip containing at least one memory; contacts and a device for contactless data transmission for supplying energy to the chip and for bi-directional data transmission from and to the chip, the contacts including a supply voltage contact; a logic circuit being connected to at least the voltage supply contact, the logic circuit supplying an output signal; and a triggerable switch device disposed on the chip and connected to the logic circuit for either connecting the memory to the contacts or to the device for contactless data transmission as a function of a state of the output signal of the logic circuit; the switch device assuming a position of repose when not triggered for connecting the memory to the device for contactless data transmission, and the switch device connecting the contacts to the memory only upon application of a voltage to the supply voltage contact, triggered by the logic circuit.

Accordingly, unambiguous switching to the conventional or the contactless mode prevails at all times. Malfunctions from simultaneous power supply through an electromagnetic field in the conventional mode are precluded. A further increase in security is provided because it is not possible to first gain access to a memory region through contacts and to then carry out operations in the contactless mode that would normally not be possible in the contactless mode. There is no switchover signal for returning from the conventional mode to the contactless mode. Doing so can be carried out only by turning off the supply voltage at the contacts.

In accordance with another feature of the invention, in order to further increase the security against misuse, the logic circuit is also connected to a clock signal contact. The logic circuit is constructed in such a way that it triggers the switch device only when both a supply voltage and a clock signal are present.

In accordance with a further feature of the invention, the logic circuit is constructed with a microprocessor. As a result, additional safety functions can be introduced.

In accordance with an added feature of the invention, in addition to the supply voltage and a clock signal, a data signal is also transmitted to the microprocessor, so that the microprocessor switches over the switch from the position of repose only whenever these three conditions are all met at once. For instance, the data signal may be a command that tells the microprocessor to switch over the switch. However, it may also be a personal identification number or so-called PIN, that is compared in the microprocessor with a number stored in memory there. A switchover of the switch is possible only when a positive comparison has taken place. Naturally, other authentication possibilities are conceivable as well, as a result of the use of the microprocessor.

In accordance with an additional feature of the invention, the memory can be connected to the contacts only through the microprocessor. Especially high security is gained in this way.

In accordance with a concomitant feature of the invention, the memory can be connected to the supply voltage contact only through a switch triggerable by the logic circuit. A further increase in security is accomplished in this way.

Other features which are considered as characteristic for the invention are set forth in the appended claims.

Although the invention is illustrated and described herein as embodied in a chip card, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a block circuit diagram of an exemplary embodiment of the invention.

DESCRIPTION OF THE PREFERRED EMBODIMENTS

Referring now in detail to the single FIGURE of the drawing, there is seen a basic circuit in which a memory 1 is connected to a coil 2. A high-frequency signal that is received is supplied from the coil 2 over a first line 6 to a processing circuit 7, which extracts the clock and the data from it and supplies them through a switch device 9 to the memory 1. The switch device 9 assumes a position of repose, in which a switch 91 of the switch device 9 connects the memory 1 constantly through the processing circuit 7 to the coil 2.

A supply voltage which is derived from the coil 2 through the use of a rectifier and smoothing circuit 3 and a control circuit 4, can be applied through a line 5 to both the processing circuit 7 and the memory 1.

A control portion 92 of the switch device 9 may be triggered by a logic circuit 8, which is advantageously constructed as a microprocessor, so that the switch 91 connects the memory 1 through the microprocessor 8 to contacts 20. However, this switchover can only occur when a supply voltage VDD is applied to a supply voltage contact 21 of the contacts 20 and supplies the microprocessor 8.

The switch device 9 can be triggered only by the microprocessor 8, so that it is not possible to use signals at the coil 2 to return the switch 91 to its position of repose and reconnect the memory 1 to the coil 2. Doing that is possible only once there is no longer any supply voltage VDD applied to the microprocessor 8.

The microprocessor 8 may be constructed in such a way that triggering of the switch device 9 is effected only when not only the supply voltage VDD but also a clock signal are applied to a clock signal contact 23.

According to another advantageous feature of the invention, the microprocessor 8 does not output a control signal to the switch device unless a data signal has previously been transmitted through a data contact 22. Through the use of this provision it can be assured that an alteration of the data stored in the memory 1 is possible through the microprocessor 8 only after a special data signal has been transmitted to the microprocessor 8 through the data contact 22.

A switch 10 which is also provided does not apply the supply voltage VDD, that is present at the supply voltage contact 21, to the memory 1 until it has been triggered by a corresponding signal from the microprocessor 8. Naturally, this control signal may be identical to the control signal for the control portion 92 of the switch device 9.

This control signal can be used for even more purposes: The control device 4 is intended to prevent the supply voltage for the memory 1 and the processing circuit 7 from becoming too high, as can happen if the card comes too close to a transmitter coil. A voltage limiter in this control circuit has a certain deviation range, for example from 4.5 to 5.5 V. If a certain voltage limiter is at 4.5 V and the card is used in a contact reader device, it can happen that a supply voltage which is higher than the 4.5 V is impressed through the supply voltage contact 21, thus thermally threatening the voltage controller. The voltage limiter can be switched over or turned off with the control signal.

The switch 10 does serve on one hand to connect the memory 1 to the supply voltage VDD only after a control signal is received from the microprocessor 8, but it also assures that the supply voltage, which in the contactless mode is applied through the line 5 from the coil 2 to the memory 1 and the processing circuit 7, will not reach the microprocessor 8. This has the advantage on one hand of preventing the microprocessor 8 from being operated through the coil 2, but it also has the further advantage of assuring lower energy consumption in the contactless mode. Nevertheless, it may certainly be desirable not to require any switch in the supply voltage line on the integrated semiconductor chip, because such a switch always results in a voltage drop and therefore a limitation in the supply voltage range. For instance, it would also be conceivable to connect the output of the rectifier 3 or the control circuit 4 through the line 5 to the supply voltage contact 21. Since the current consumption of a circuit often depends on the clock frequency, electrical current can then be spared, because unneeded parts are not clocked. In the contactless mode, no clock signal is applied to the contacts, so that the circuit portion for the conventional mode, and in particular the microprocessor 8, can be connected to supply voltage without consuming significant current.

We claim:

1. A chip card, comprising:

a semiconductor chip containing at least one memory;

contacts including a supply voltage contact and a device for contactless data transmission for supplying energy to said chip and for bi-directional data transmission from and to said chip, said device including a coil fixedly connected to said at least one memory;

a logic circuit being connected to at least said voltage supply contact, said logic circuit supplying an output signal;

a triggerable switch device disposed on said chip and connected to said logic circuit for alternatively connecting said memory to said contacts and to said device for contactless data transmission as a function of a state of the output signal of said logic circuit;

said switch device assuming a position of repose when not triggered for connecting said memory to said device for contactless data transmission, and said switch device connecting said contacts to said memory upon application of a voltage to said supply voltage contact, triggered by said logic circuit; and a further switch device to be triggered by said logic circuit for connecting said memory to said supply voltage contact.

2. A chip card, comprising:

a semiconductor chip containing at least one memory;

contacts and a device for contactless data transmission for supplying energy to said chip and for bi-directional data transmission from and to said chip, said contacts including a supply voltage contact;

a logic circuit being connected to at least said voltage supply contact, said logic circuit supplying an output signal;

a triggerable switch device disposed on said chip and connected to said logic circuit for alternatively connecting said memory to said contacts and to said device for contactless data transmission as a function of a state of the output signal of said logic circuit;

said switch device assuming a position of repose when not triggered for connecting said memory to said device for contactless data transmission, and said switch device connecting said contacts to said memory upon application of a voltage to said supply voltage contact, triggered by said logic circuit;

said contacts include a clock signal contact, and said logic circuit is connected to said clock signal contact for triggering said switch device only when both a supply voltage and a clock signal are present.

3. The chip card according to claim 2 wherein said logic circuit includes a microprocessor, said switch device is triggered by said microprocessor and connects said contacts to said memory in the presence of the supply voltage, the clock signal and a data signal at said contacts connected to said microprocessor.

4. The chip card according to claim 2, wherein said memory is connected to said contacts through a microprocessor.

5. A chip card, comprising:

a semiconductor chip containing a memory;

contacts including a supply voltage contact;

a rectifier;

a coil connected to said rectifier for contactless data transmission, for supplying energy to said chip, and for bi-directional data transmission from and to said chip, said memory fixedly connected to said coil;

a logic circuit connected to said voltage supply contact, said logic circuit supplying a control signal; and a switch triggerable between a first position in which said supply voltage contact is connected to said memory and a second position in which said supply voltage contact is not connected to said memory, said switch responsive to said control signal for triggering between said first and second positions.

* * * * *